(12) United States Patent
Yamada

(10) Patent No.: US 10,154,195 B2
(45) Date of Patent: Dec. 11, 2018

(54) IMAGE JOINING APPARATUS, IMAGE PICKUP APPARATUS, IMAGE JOINING METHOD, AND IMAGE JOINING PROGRAM

(71) Applicant: JVC KENWOOD Corporation, Yokohama-shi, Kanagawa (JP)

(72) Inventor: Kunio Yamada, Yokohama (JP)

(73) Assignee: JVC KENWOOD CORPORATION, Kanagawa (JP)

( * ) Notice: Subject to any disclaimer, the term of this patent is extended or adjusted under 35 U.S.C. 154(b) by 141 days.

(21) Appl. No.: 15/454,999

(22) Filed: Mar. 9, 2017

(65) Prior Publication Data

US 2017/0180641 A1   Jun. 22, 2017

Related U.S. Application Data

(63) Continuation of application No. PCT/JP2015/004608, filed on Sep. 10, 2015.

(30) Foreign Application Priority Data

Sep. 25, 2014   (JP) .................. 2014-195118

(51) Int. Cl.
| H04N 5/232 | (2006.01) |
| G06T 7/38 | (2017.01) |
| G06T 7/20 | (2017.01) |
| H04N 5/265 | (2006.01) |
| G06T 3/40 | (2006.01) |

(Continued)

(52) U.S. Cl.
CPC ....... H04N 5/23238 (2013.01); G06T 3/4038 (2013.01); G06T 5/003 (2013.01);
(Continued)

(58) Field of Classification Search
CPC ........... G06T 7/38; G06T 7/20; G06T 3/4038; G06T 5/003; G06T 5/50; G06T 7/246;
(Continued)

(56) References Cited

U.S. PATENT DOCUMENTS

| 2011/0142426 A1* | 6/2011 | Sasaki | ................ G11B 20/1217 386/337 |
| 2011/0187817 A1* | 8/2011 | Sasaki | ................ G11B 27/00 348/42 |

(Continued)

FOREIGN PATENT DOCUMENTS

| JP | H06-284321 A | 10/1994 |
| JP | 3158735 B2 | 4/2001 |

(Continued)

OTHER PUBLICATIONS

Guillen Gonzalez, M., et al., Improved Video Mosaic Construction by Accumulated Alignment Error Distribution, Proc. British Machine Vision Conference, 1998, pp. 377-387.

*Primary Examiner* — Tung T Vo
(74) *Attorney, Agent, or Firm* — Procopio, Cory, Hargreaves & Savitch LLP

(57) ABSTRACT

An image joining apparatus includes: a motion vector detection unit that detects a motion vector between images; a motion compensating unit that performs correction of compensating for a positional difference value between the images on one of the images using the motion vector to generate a motion compensated image; a difference determination unit that selects one of the images and determines whether a difference value between adjacent pixels in the selected image is equal to or larger than a value; an overwriting unit that overwrites another image with the selected image in an area of the selected image in which the difference value between the adjacent pixels is equal to or larger than the value; and a mixing unit that locally mixes the selected image and the other image in an area of the selected image in which the difference value between the adjacent pixels is smaller than the value.

6 Claims, 6 Drawing Sheets

(51) Int. Cl.
*G06T 5/00* (2006.01)
*G06T 5/50* (2006.01)
*H04N 9/04* (2006.01)
*G06T 7/246* (2017.01)

(52) U.S. Cl.
CPC .............. *G06T 5/50* (2013.01); *G06T 7/20* (2013.01); *G06T 7/246* (2017.01); *G06T 7/38* (2017.01); *H04N 5/23254* (2013.01); *H04N 5/23267* (2013.01); *H04N 5/265* (2013.01); *H04N 9/045* (2013.01); *G06T 2207/10016* (2013.01); *G06T 2207/20221* (2013.01)

(58) Field of Classification Search
CPC ........... G06T 2207/10016; G06T 2207/20221; H04N 5/23238; H04N 5/23267; H04N 5/265; H04N 5/23254; H04N 9/045
See application file for complete search history.

(56) References Cited

U.S. PATENT DOCUMENTS

| | | | | |
|---|---|---|---|---|
| 2012/0098935 | A1* | 4/2012 | Schmidt | G01S 17/89 348/46 |
| 2012/0274845 | A1* | 11/2012 | Motoyama | H04N 7/0115 348/441 |
| 2015/0092833 | A1* | 4/2015 | Ku | H04N 19/176 375/240.02 |

FOREIGN PATENT DOCUMENTS

| | | |
|---|---|---|
| JP | 3421859 B2 | 6/2003 |
| JP | 2006-135386 A | 5/2006 |
| JP | 2013-030874 A | 2/2013 |
| JP | 2013-030875 A | 2/2013 |

* cited by examiner

IMAGE JOINING APPARATUS, IMAGE PICKUP APPARATUS, IMAGE JOINING METHOD, AND IMAGE JOINING PROGRAM

CROSS REFERENCE TO RELATED APPLICATION

This application is Continuation Application from PCT application No. PCT/JP2015/004608 filed Sep. 10, 2015 which claims the benefit of priority from Japanese patent application No. 2014-195118, filed on Sep. 25, 2014, the disclosure of which is incorporated herein in its entirety by reference.

BACKGROUND

The present invention relates to an image joining apparatus, an image pickup apparatus, an image joining method, and an image joining program, and relates to, for example, an image joining apparatus, an image pickup apparatus, an image joining method, and an image joining program that join a plurality of still images or moving image sequences to create a still image.

In recent years, a technique for photographing a moving image while manually moving a camera so as to cover a large subject, joining a plurality of frames constituting the moving image, to thereby create a still image panorama has been put into practical use. Such a technique for creating a panoramic still image is generalized in the form of, for example, an additional function of a digital camera. Further, this technique is based on, as disclosed in Japanese Patent No. 3158735, Japanese Unexamined Patent Application Publication No. 6-284321 and Japanese Patent No. 3421859, a method in which a motion vector is derived during shooting with a panning technique and an area for a seam between frame images to be stitched together is controlled based on the motion vector.

There is also a conventional technique for forming a large image by connecting a plurality of still images or moving image sequences and this technique is generally and widely known as panorama, photomosaicing, and the like. Especially since the time that use of digital cameras became widespread, the use of software for automatically or semi-automatically performing such processing has become widespread. While the aforementioned Japanese Patent No. 3158735, Japanese Unexamined Patent Application Publication No. 6-284321 and Japanese Patent No. 3421859 are based on a linear camera trajectory, a technique for joining moving images captured along a free two-dimensional camera trajectory in principle is disclosed in Japanese Unexamined Patent Application Publication No. 2006-135386, Japanese Unexamined Patent Application Publication No. 2013-30874, Japanese Unexamined Patent Application Publication No. 2013-30875 and M. G. Gonzalez, P. Holifield and M. Varley, "Improved Video Mosaic Construction by Accumulated Alignment Error Distribution", Proceedings of the British Machine Conference, pp. 38.1-38.11, BMVA Press, September 1998.

SUMMARY

However, in the image joining according to related art, a conspicuous boundary due to exposure and a change in hue is generated between images that are adjacent to each other.

The embodiment provides an image joining apparatus including: a motion vector detection unit that detects a motion vector between a plurality of images; a motion compensating unit that performs correction of compensating for a positional difference value between the plurality of images on one of the plurality of images using the motion vector to generate a motion compensated image; a difference determination unit that selects one of the plurality of images and determines whether a difference value between pixels adjacent to each other in the selected image is equal to or larger than a predetermined value; an overwriting unit that overwrites another image with the selected image in an area of the selected image in which the difference value between the pixels adjacent to each other is equal to or larger than the predetermined value; and a mixing unit that locally mixes the selected image and the other image in an area of the selected image in which the difference value between the pixels adjacent to each other is smaller than the predetermined value.

The embodiment provides an image pickup apparatus including: an image joining unit including: a motion vector detection unit that detects a motion vector between a plurality of images; a motion compensating unit that performs correction of compensating for a positional difference value between the plurality of images on one of the plurality of images using the motion vector to generate a motion compensated image; a difference determination unit that selects one of the plurality of images and determines whether a difference value between pixels adjacent to each other in the selected image is equal to or larger than a predetermined value; an overwriting unit that overwrites another image with the selected image in an area of the selected image in which the difference value between the pixels adjacent to each other is equal to or larger than the predetermined value; and a mixing unit that locally mixes the selected image and the other image in an area of the selected image in which the difference value between the pixels adjacent to each other is smaller than the predetermined value; a moving image pickup unit that continuously captures images; a storage unit that stores the images; and a display unit that displays the images, in which: the image joining unit joins the plurality of images captured by the moving image pickup unit, the storage unit stores the image joined by the image joining unit, and the display unit displays the image joined by the image joining unit.

The embodiment provides an image joining method including: a motion correcting process that performs correction of compensating for a positional difference value between a plurality of images on one of the plurality of images; a difference determination process that determines whether a difference value between pixels adjacent to each other in the image is equal to or larger than a predetermined value; an overwriting process that overwrites another image with the image in an area in which the difference value between the pixels adjacent to each other is equal to or larger than the predetermined value; and a locally mixing process that locally mixes the image and the other image in an area in which the difference value between the pixels adjacent to each other is smaller than the predetermined value.

The embodiment provides a non-transitory computer readable medium storing an image joining program including: a step of receiving an image from an image input apparatus; a motion correction step that performs correction of compensating for a positional difference value between a plurality of images on the image; a difference determination step that determines whether a difference value between pixels adjacent to each other in the image is equal to larger than a predetermined value; an overwriting step that overwrites another image with the image in an area in which the difference value between the pixels adjacent to each other is equal to or larger than the predetermined value; a locally mixing step that locally mixes the image and the other image in an area in which the difference value between the pixels adjacent to each other is smaller than the predetermined value; and an output step that outputs the image after overwriting and local mixing to an image output apparatus.

DETAILED DESCRIPTION

Hereinafter, with reference to the drawings, an embodiment will be described.

Figure 1:
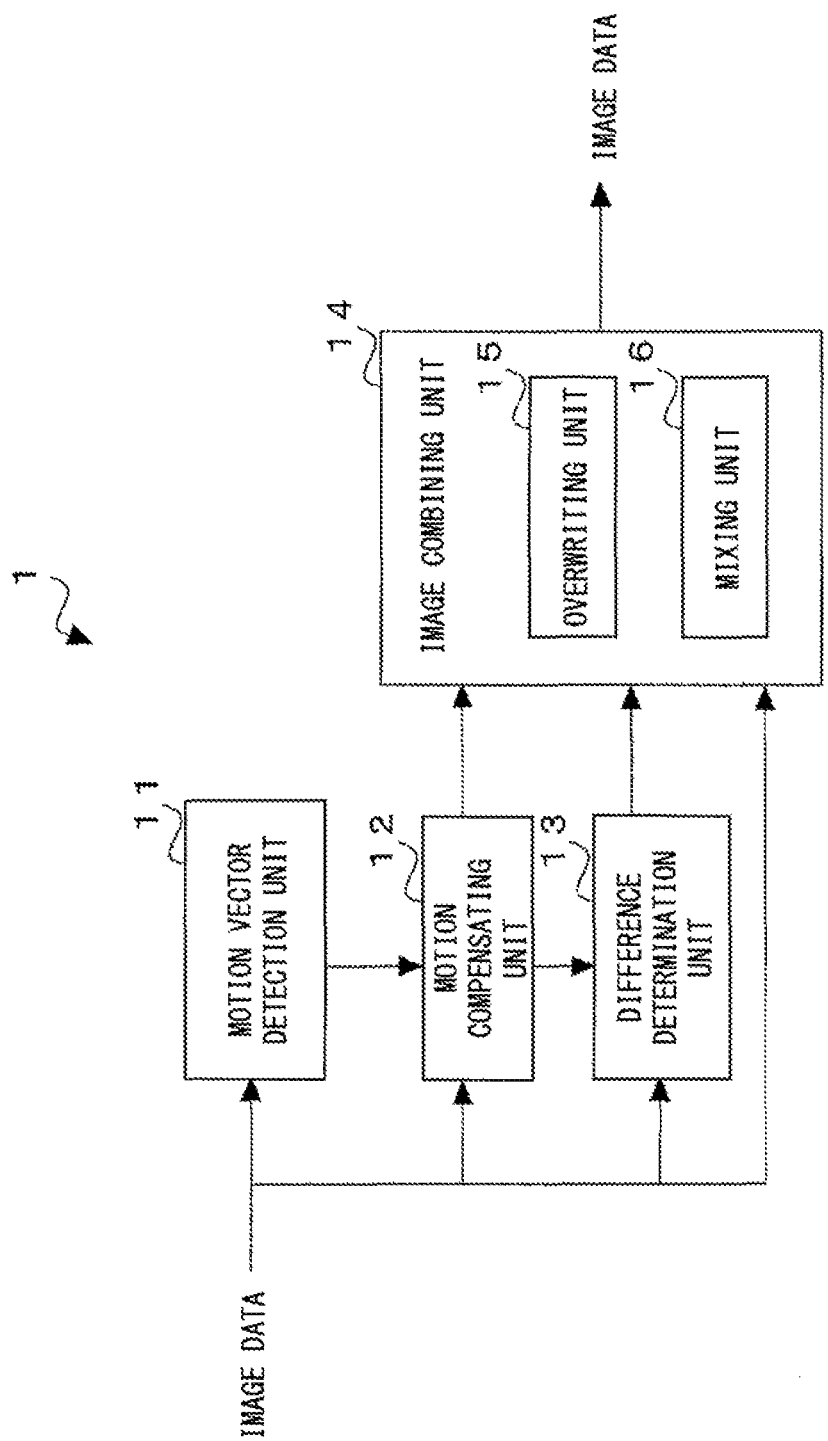
FIG. 1 is a block diagram showing a configuration of an image joining apparatus according to an embodiment.

FIG. 1 is a block diagram showing a configuration of an image joining apparatus according to an embodiment. In FIG. 1, an image joining apparatus 1 includes a motion vector detection unit 11, a motion compensating unit 12, a difference determination unit 13, and an image combining unit 14. Further, the image combining unit 14 includes an overwriting unit 15 and a mixing unit 16. The image joining apparatus 1 performs processing of joining a plurality of images that have been input with time intervals. First, the image joining apparatus 1 processes the input images in each of the motion vector detection unit 11, the motion compensating unit 12, the difference determination unit 13, and the image combining unit 14.

The motion vector detection unit 11 detects a motion vector using a matching evaluation method. The motion vector detection unit 11 compares, for example, two or more images to obtain an amount of movement of an object that is common to the images on coordinates of image data. Then the motion vector detection unit 11 outputs the amount of the movement to the motion compensating unit 12 as the motion vector, which is vector data.

Since the motion vector that has been obtained actually corresponds to a positional deviation of an object (texture) between the plurality of pieces of image data (frames), by repeating alignment of the image data in accordance with the motion vector and overwriting of the object (texture) of the image data (frame) that has been input later with the object (texture) of the image data (frame) that has been input earlier, a joined image is generated.

The motion compensating unit 12 moves each pixel of the image data to a coordinate obtained by subtracting the amount of the movement that corresponds to the motion vector. That is, the motion compensating unit 12 compensates for the difference in the position between the plurality of images by moving each pixel of the image data so that the same object is presents at the same coordinates in the plurality of pieces of image data. Then the motion compensating unit 12 outputs the image data after the compensation to the difference determination unit 13 and the image combining unit 14.

The difference determination unit 13 determines, for the image data, whether a difference value between adjacent pixels is equal to or larger than a predetermined value or smaller than the predetermined value in a pixel unit. When the luminance value of the image data is expressed by data having 8 bits and 256 levels, for example, it is determined whether the difference in the luminance value between one pixel and an adjacent pixel is equal to or larger than 10 or smaller than 10. Typically, the adjacent pixel is a pixel located in the position obtained by shifting the coordinates of one pixel in a pixel unit by +1 or −1 in one or both of the X axis and the Y axis in the two-dimensional coordinates. The image data which is to be determined may be either the image after the motion compensation or the image before the motion compensation.

Then the difference determination unit 13 determines the area in which the difference value between the adjacent pixels is equal to or larger than the predetermined value and the area in which the difference value between the adjacent pixels is smaller than the predetermined value and outputs the coordinate data in each of the areas that have been determined and the result of the determination in each of the areas to the image combining unit 14.

The image combining unit 14 overwrites, for the area in which the difference value is equal to or larger than the predetermined value, the image data by the overwriting unit 15. The image combining unit 14 overwrites the image data by a method called "solid fills", which is a method of overwriting the data in the whole area. While the image data in which the difference has been determined may be the overwriting image data and the other one may be the overwritten image data, this combination may be reversed. Further, the image data that has been captured later may be the overwriting image data and the image data that has been captured earlier may be the overwritten data. This relation between the timing when the image has been captured and overwriting may be reversed.

Then the image combining unit 14 locally mixes the image data by the mixing unit 16 for the area in which the difference value is smaller than the predetermined value. That is, the image combining unit 14 determines which one of the two images should be overwritten in a pixel unit. That is, the image combining unit 14 selects, for the area in which the difference value is smaller than the predetermined value, a pixel of one of the two images at random or by a predetermined pattern to overwrite the pixel of the selected image. According to this processing, the pixel from the different image is selected in a pixel unit, whereby it is possible to generate the image area in which the images are locally mixed.

Then the image combining unit 14 outputs the image after the overwriting and the local mixing for each area. Further, the image combining unit 14 may store the image data that has been overwritten or locally mixed to overwrite and locally mix the image data further successively.

Figure 2:
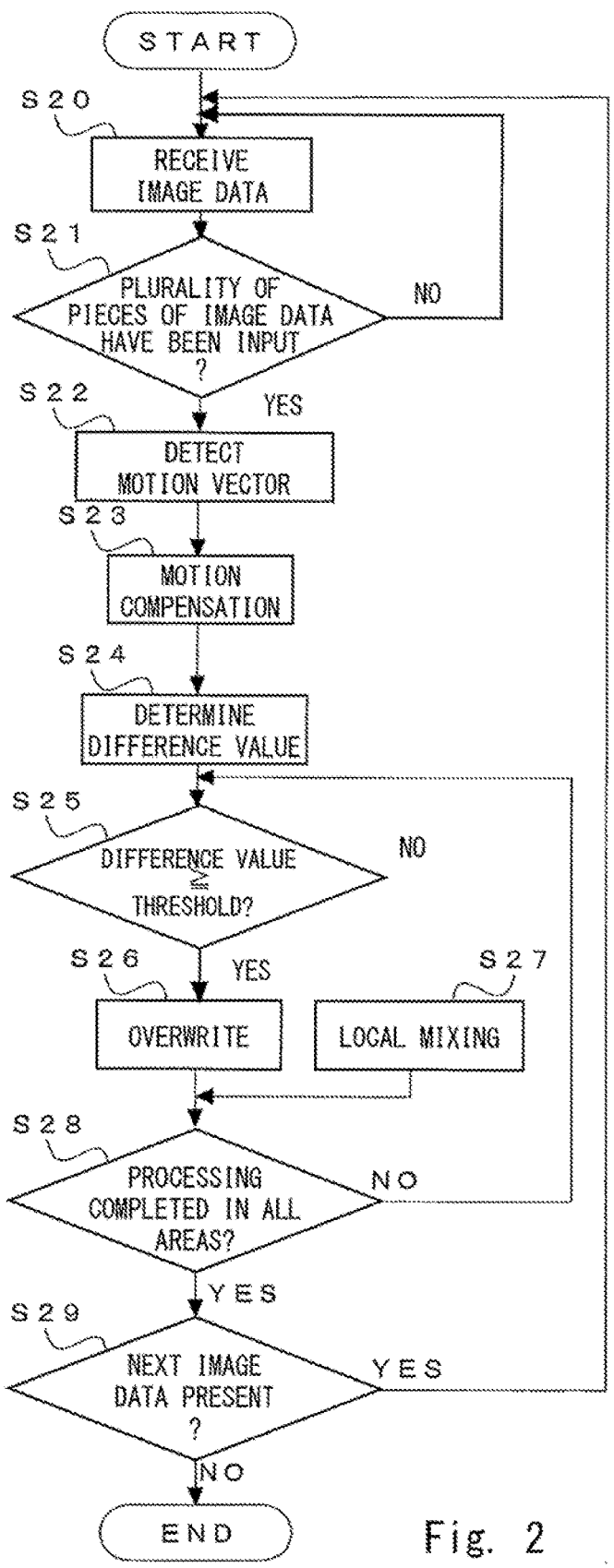
FIG. 2 is a flowchart showing an operation of the image joining apparatus according to the embodiment.

Next, a process of an operation of the image joining apparatus 1 shown in FIG. 1 will be described. FIG. 2 is a flowchart showing the operation of the image joining apparatus according to the embodiment.

In Step S20, the image joining apparatus 1 receives the input of the image data and then the operation process goes to Step S21. In Step S21, the image joining apparatus 1 determines whether the number of pieces of image data that have been received is two or larger. When the number of pieces of image data that have been received is smaller than two, the process goes back to Step S20 and when the number of pieces of image data that have been received is two or larger, the process goes to Step S22.

In Step S22, the motion vector detection unit 11 detects the motion vector between the plurality of images and then the process goes to Step S23. In Step S23, the motion compensating unit 12 performs correction of compensating for the position of the image based on the motion vector and then the process goes to Step S24.

In Step S24, the difference determination unit 13 calculates the difference value between the pixels adjacent to each other and the process then goes to Step S25. In Step S25, the difference determination unit 13 determines whether the difference value between the pixels adjacent to each other is equal to or larger than the predetermined value. When the difference value between the pixels adjacent to each other is equal to or larger than the predetermined value, the process goes to Step S26 and when the difference value between the pixels adjacent to each other is smaller than the predetermined value, the process goes to Step S27.

In Step S26, the overwriting unit 15 overwrites the image and the process goes to Step S28. In Step S27, the mixing unit 16 locally mixes the plurality of images and then process moves to Step S28.

In Step S28, the image joining apparatus 1 determines whether the overwriting processing or the locally mixing processing has been completed in all the areas of the image data. When the overwriting processing or the locally mixing processing has been completed in all the areas of the image data, the process goes to Step S29 and when the overwriting processing or the locally mixing processing has not been completed, the process goes back to Step S25.

In Step S29, the image joining apparatus 1 determines whether there is image data to be processed next. When there is image data to be processed next, the process goes back to Step S20, while when there is no image data to be processed next, the process ends.

As described above, the image joining apparatus according to the embodiment overwrites an image when the difference value between the pixels adjacent to each other is large and locally mixes images when the difference value between the pixels adjacent to each other is small, whereby it is possible to perform processing in accordance with the difference value between the pixels and to join images in such a way that the difference in color does not stand out.

While the locally mixing processing is performed after the overwriting processing is performed in the description with reference to FIG. 1, the order of performing the overwriting processing and the locally mixing processing may be reversed.

Figure 3:
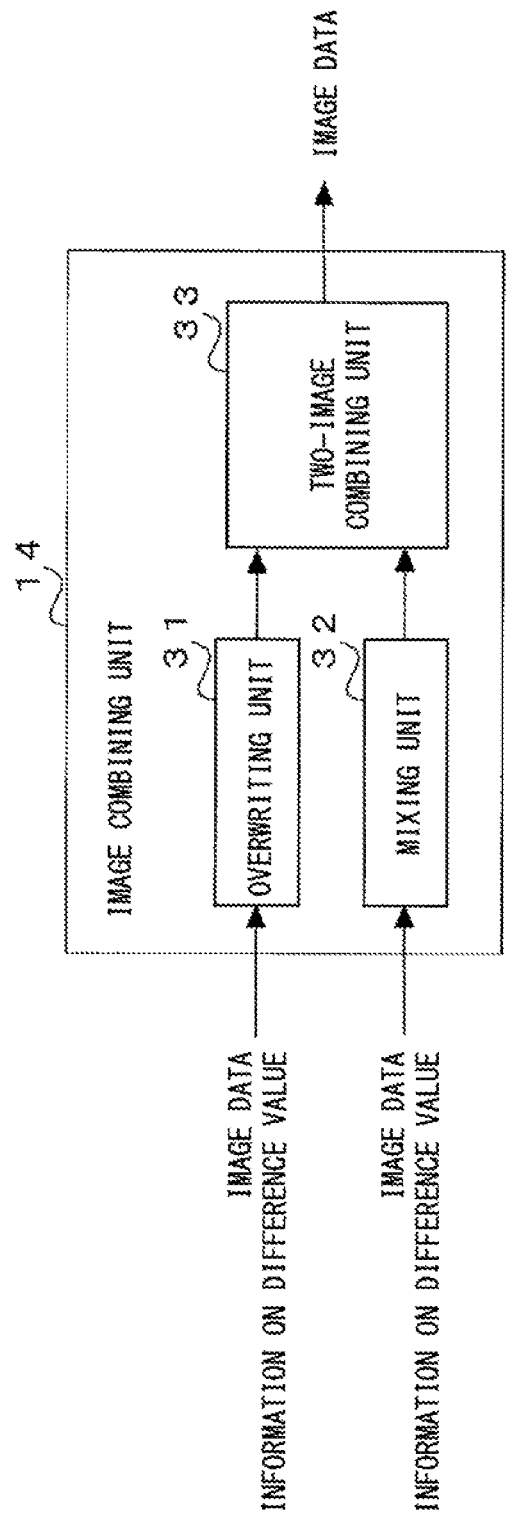
FIG. 3 is a block diagram showing a configuration of an image combining unit 14 of the image joining apparatus according to the embodiment.

Further, the overwriting processing and the locally mixing processing can be performed at the same time or in parallel with each other. FIG. 3 is a block diagram showing a configuration of the image combining unit 14 of the image joining apparatus according to the embodiment. In FIG. 3, the image combining unit 14 includes an overwriting unit 31, a mixing unit 32, and a two-image combining unit 33.

The image combining unit 14 transfers the image data that has been input, the image data which has been subjected to the motion compensation, and information on the difference value to the overwriting unit 31 and the mixing unit 32. The image combining unit 14 overwrites the image data by the overwriting unit 31 for the area in which the difference value is equal to or larger than the predetermined value. Further, the image combining unit 14 locally mixes the image data by the mixing unit 32 for the area in which the difference value is smaller than the predetermined value.

The image combining unit 14 then combines both pieces of image data overwritten and locally mixed for each area by the two-image combining unit 33 and then outputs the image data after the combination.

As described above, in the image joining apparatus according to this embodiment, a plurality of pieces of the same image data are prepared and overwriting and local mixing are separately performed in parallel, whereby it is possible to simultaneously perform different types of image processing and to thus improve the processing speed.

Figure 4:
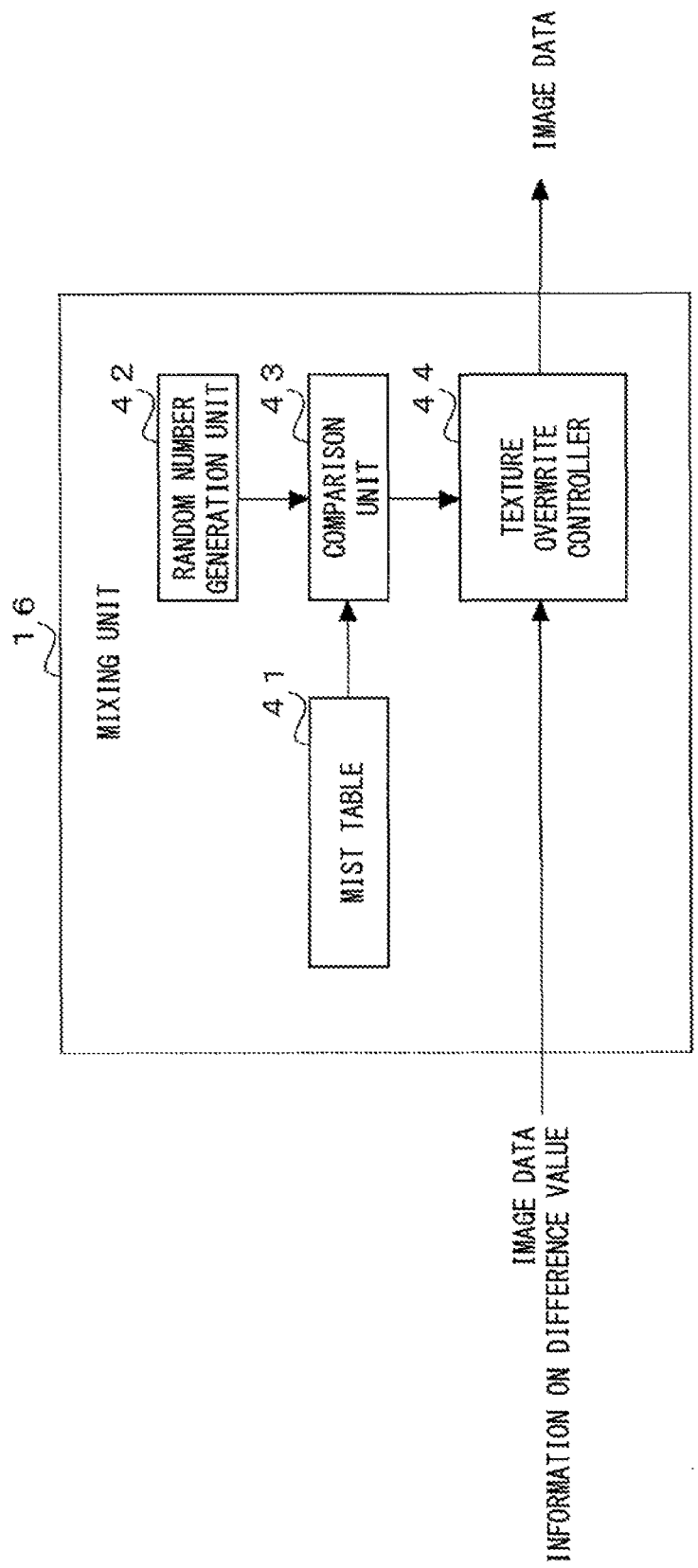
FIG. 4 is a block diagram showing a configuration of a mixing unit 16 of the image joining apparatus according to the embodiment.

Next, details of the configurations of the image joining apparatus according to this embodiment will be described. FIG. 4 is a block diagram showing a configuration of the mixing unit 16 of the image joining apparatus according to the embodiment. In FIG. 4, an example in which the mixing unit 16 combines the image data that involves changes in density of images like an air brush will be described. These changes in density of images are similar to, for example, changes in a concentration of spray particles and are expressed by the word "mist" in this embodiment.

In FIG. 4, the mixing unit 16 includes a mist table 41, a random number generation unit 42, a comparison unit 43, and a texture overwrite controller 44.

The mist table 41 is a table in which two-dimensional coordinates and the mist concentration are associated with each other. The mist concentration depends on the geometric position of the pixel of the texture to be overwritten and is set within a range from 0 to 1 in advance. The value 0 indicates off, which means that the pixel is not updated and the value 1 indicates that the pixel is always updated. When the value is intermediate, random ON/OFF that depends on the probability of the concentration is performed.

The random number generation unit 42 generates a threshold to be compared with the mist concentration by a random number in a pixel unit and outputs the random number to the comparison unit 43. As described above, the mist concentration is set within a range from 0 to 1 in advance and the random number generation unit 42 generates the random number within a range from 0 to 1. In one method of generating the random number, the random number generation unit 42 generates the random number, for example, by a pseudo random number sequence using a computer.

The comparison unit 43 compares the mist concentration output from the mist table 41 with the random number generated in the random number generation unit 42 in a pixel unit. Then the comparison unit 43 outputs the results of the comparison to the texture overwrite controller 44. When the mist concentration is equal to or larger than the random number, for example, the comparison unit 43 outputs 1. Further, when the mist concentration is smaller than the random number, the comparison unit 43 outputs 0.

The texture overwrite controller 44 performs control, based on the results of the comparison in the comparison unit 43, to update the data with the overwriting image data or to use the overwritten image data without updating the data in a pixel unit, to thereby locally mix the image data. Specifically, when the mist concentration is equal to or larger than the random number, the texture overwrite controller 44 overwrites and updates the pixel, and when the mist concentration is smaller than the random number, the texture overwrite controller 44 does not update the pixel. Then the texture overwrite controller 44 outputs the image data after performing of the locally mixing processing.

According to the aforementioned configuration, it is possible to determine whether to perform updating at random in accordance with the mist concentration and to achieve overwriting like an air brush.

Figure 5:
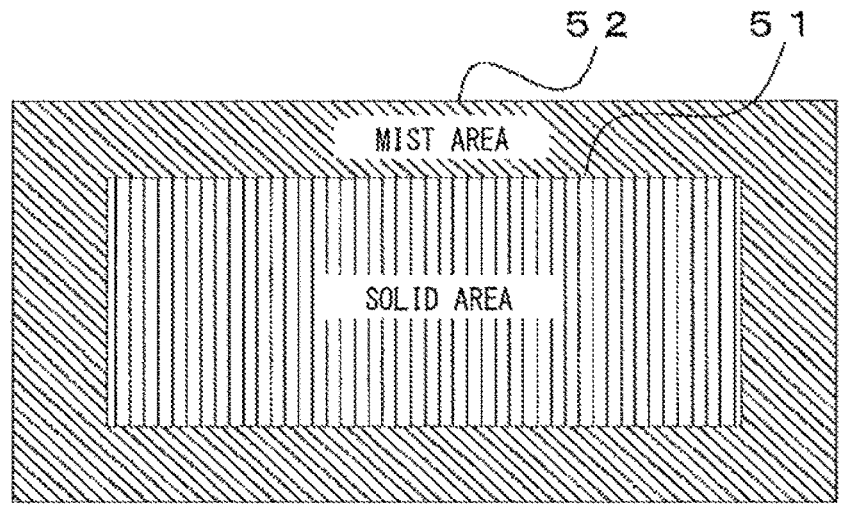
FIG. 5 is a diagram showing an example of image processing of the image joining apparatus according to the embodiment.
Figure 6:
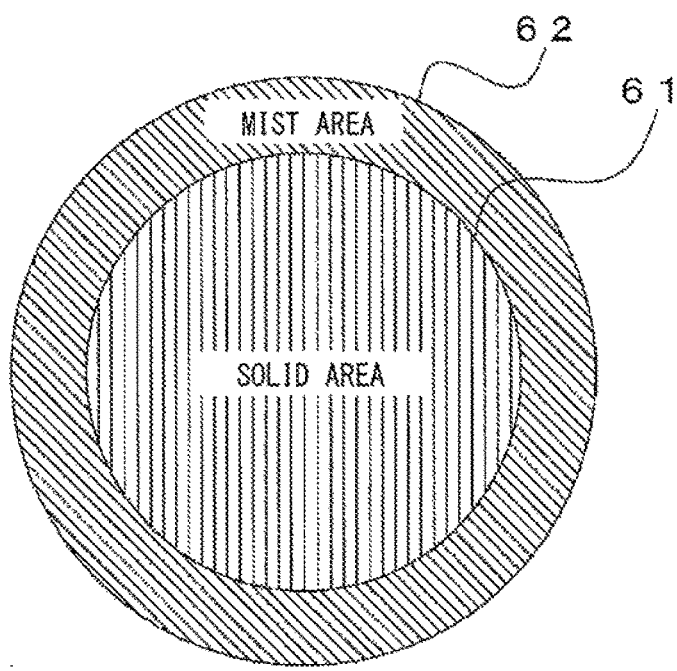
FIG. 6 is a diagram showing an example of the image processing of the image joining apparatus according to the embodiment.

The data of the mist concentration may be held in the form of a table with respect to the coordinates or an algorithm that causes automatic generation may be designed and this algorithm may be executed by a computer. Further, the mist concentration may be expressed by a desired form. As shown in FIG. 5, an area which is shown as a typical rectangular shape may have a central area 51 having a concentration of 1 (solid area) and an outer peripheral area 52 having a concentration gradually decreased from 1 to 0 toward the outer periphery. Further, the shape of the texture overwriting is not limited to the rectangular shape and may be, for example, a circular shape as shown in FIG. 6. In this case as well, in an inner circle area 61, the concentration is set to 1 and in an outer circle area 62, the concentration is decreased from 1 to 0 toward the outer periphery. Any desired shape other than a circle may be used by a method similar to that stated above.

As described above, in the image joining apparatus according to this embodiment, the image data is overwritten sparsely toward ends of the image, like an air brush, whereby it is possible to prevent the generation of the conspicuous boundary. At the same time, normal overwriting is performed for the texture including a high range in which the boundary does not generally stand out, whereby it is possible to prevent the image from being noisy.

Figure 7:
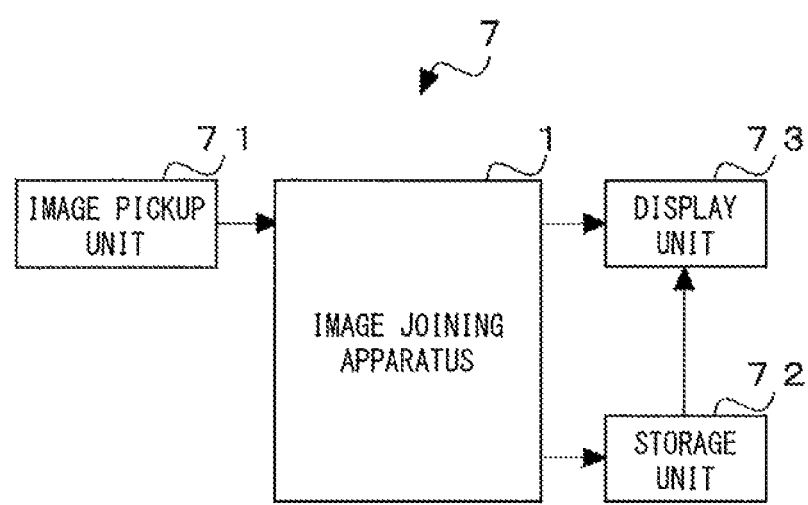
FIG. 7 is a block diagram showing a configuration of an image pickup apparatus according to the embodiment.

Next, the image pickup apparatus that uses the image joining apparatus according to the embodiment will be described. FIG. 7 is a block diagram showing a configuration of the image pickup apparatus according to the embodiment. In FIG. 7, an image pickup apparatus 7 includes an image joining apparatus 1, an image pickup unit 71, a storage unit 72, and a display unit 73.

The image pickup unit 71 continuously captures images of a subject at a plurality of timings and outputs image data that has been captured to the image joining apparatus 1. The image joining apparatus 1 joins the image data that has been captured and outputs the image data that has been joined to the storage unit 72 and the display unit 73. The image pickup unit 71 is preferably a CCD device or a CMOS device and preferably includes a lens. Further, the image pickup unit 71 may be arranged in a position different from the position where the image joining apparatus 1 is arranged and may transmit the captured data to the image joining apparatus 1 by a wired communication, a wireless communication or the like.

The storage unit 72 stores the image data joined in the image joining apparatus 1. Further, the storage unit 72 outputs the image data that the storage unit 72 stores to the display unit 73. The storage unit 72 may be a semiconductor memory such as a RAM, a magnetic storage medium such as a hard disc, or an optical magnetic storage medium such as a DVD.

The display unit 73 displays the image output from the image joining apparatus 1 or the storage unit 72. The display unit 73 is preferably formed of, for example, a liquid crystal display, an organic EL display, or a plasma display.

As described above, according to the image pickup apparatus according to this embodiment, when the images of the subject are continuously captured by changing the photographing direction such as in panoramic photography to join the plurality of images, the image may be overwritten when the difference value between the pixels adjacent to each other is large, and the images may be locally mixed when the difference value between the pixels adjacent to each other is small, whereby it is possible to process the images in accordance with the difference value between the pixels and to join the images without causing the difference in color to stand out.

Note that the present invention is not limited to the aforementioned embodiment and may be changed as appropriate without departing from the spirit of the present invention.

The motion vector detection unit 11 may specifically detect the motion vector, for example, by the following method: executing a block matching between blocks in two frames, searching a pair of blocks in which an absolute value error or a squared error of the luminance value becomes minimum, and employing the vector that connects this pair as the motion vector. Further, a more accurate motion vector may be selected using the relevance of the motion vector between adjacent blocks. It may be possible, for example, to perform median-filtering of the motion vector of a reference block based on whether the position of the reference block of the current frame of a video signal that is input is an object's boundary area adjacent to a video area in which the amount of motion is small.

While the difference value between the pixels is used as the value to determine whether to perform overwriting or local mixing in the aforementioned description, the specific difference value used for the determination may be any difference of parameters regarding colors such as a luminance value, a color difference value or the like. The value used for the determination may be, for example, one of the following elements: luminance of red, green, and blue in RGB or RGBA, color transparency, the degree of color of cyan, magenta, yellow, and black in CMY, CMYK, and CNK, hue, chroma, and brightness in an HSV color space, hue, chroma, and luminance in an HLS color space, luminance and each constant in a YUV color space, brightness in an Lab color space, and a difference value of one of a position between red/magenta and green and a position between yellow and blue or a combination of a plurality of difference values.

Further, the processing in each structure of the image joining apparatus can be executed by hardware such as an Application Specific Integrated Circuit (ASIC) or software. Further, some of the processings may be executed by software and the others may be executed by hardware. When the processing is executed by software, a computer system including one or a plurality of Central Processing Units (CPUs) such as a microprocessor may execute programs regarding processing of functional blocks. These programs can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, a Digital Versatile Disc Read Only Memory (DVD-ROM), DVD Recordable (DVD-R), DVD-R Dual Layer (DVD-R DL), DVD ReWritable (DVD-RW), DVD-RAM, DVD+R, DVR+R DL, DVD+RW, Blu-ray (registered trademark) Disc Recordable (BD-R), Blu-ray (registered trademark) Disc Rewritable (BD-RE), BD-ROM, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The embodiment is applicable to image joining apparatuses, image pickup apparatuses, image joining methods, and image joining programs, and in particular, to image joining apparatuses, image pickup apparatuses, image joining methods, and image joining programs that join a plurality of still images or moving image sequences to create a still image.

What is claimed is:

1. An image joining apparatus comprising:
a motion vector detection unit that detects a motion vector between a plurality of images;
a motion compensating unit configured to perform correction of compensating for a positional difference value between the plurality of images on one of the plurality of images using the motion vector to generate a motion compensated image;
a difference determination unit configured to select one of the plurality of images and determine whether a difference value between pixels adjacent to each other in the selected image is equal to or larger than a predetermined value;
an overwriting unit configured to overwrite another image with the selected image in an area of the selected image in which the difference value between the pixels adjacent to each other is equal to or larger than the predetermined value; and
a mixing unit configured to locally mix the selected image and the other image in an area of the selected image in which the difference value between the pixels adjacent to each other is smaller than the predetermined value.

2. The image joining apparatus according to claim 1, wherein the difference value is a luminance difference or a color difference.

3. The image joining apparatus according to claim 1, comprising a two-image composer configured to combine the image overwritten in the overwriting unit and the image that has been locally mixed in the mixing unit in an area in which the overwriting and local mixing are performed, wherein the overwriting unit and the mixing unit process images separately.

4. The image joining apparatus according to claim 1, wherein the mixing unit overwrites an image in the area in which images are locally mixed so that overwriting pixels are distributed densely.

5. An image joining method comprising:
a motion correcting process that performs correction of compensating for a positional difference value between a plurality of images on one of the plurality of images;
a difference determination process that determines whether a difference value between pixels adjacent to each other in the image is equal to or larger than a predetermined value;
an overwriting process that overwrites another image with the image in an area in which the difference value between the pixels adjacent to each other is equal to or larger than the predetermined value; and
a locally mixing process that locally mixes the image and the other image in an area in which the difference value between the pixels adjacent to each other is smaller than the predetermined value.

6. A non-transitory computer readable medium storing an image joining program comprising:
a step of receiving an image from an image input apparatus;
a motion correction step that performs correction of compensating for a positional difference value between a plurality of images on the image;
a difference determination step that determines whether a difference value between pixels adjacent to each other in the image is equal to larger than a predetermined value;
an overwriting step that overwrites another image with the image in an area in which the difference value between the pixels adjacent to each other is equal to or larger than the predetermined value;
a locally mixing step that locally mixes the image and the other image in an area in which the difference value between the pixels adjacent to each other is smaller than the predetermined value; and
an output step that outputs the image after overwriting and local mixing to an image output apparatus.

* * * * *